United States Patent [19]

Tanaka et al.

[11] Patent Number: 4,710,353
[45] Date of Patent: Dec. 1, 1987

[54] CORROSIVE LIQUID LEAK DETECTING SENSOR

[75] Inventors: Satoshi Tanaka, Hitaka; Haruo Imaizumi, Nishi-Asuma, both of Japan

[73] Assignee: Junkosha Co., Ltd., Japan

[21] Appl. No.: 884,725

[22] Filed: Jul. 11, 1986

[30] Foreign Application Priority Data

Jul. 19, 1985 [JP] Japan .............................. 60-159557

[51] Int. Cl.$^4$ ..................... G01N 17/00; G01N 21/17; G01N 21/71; G02B 6/22
[52] U.S. Cl. ......................................... 422/68; 422/53; 436/3; 436/151; 436/152; 73/40; 350/96.29
[58] Field of Search ............... 422/68, 53; 436/3, 151, 436/152; 73/40; 350/96.29

[56] References Cited

U.S. PATENT DOCUMENTS

| | | | |
|---|---|---|---|
| 4,029,889 | 6/1977 | Mizuochi | 340/605 X |
| 4,132,540 | 1/1979 | Edwards et al. | 423/309 X |
| 4,206,632 | 6/1980 | Suzuki | 73/40.5 |
| 4,283,250 | 8/1981 | Abrahamson et al. | 159/1.1 X |
| 4,300,689 | 11/1981 | Franklin et al. | 73/41.4 X |
| 4,404,516 | 9/1983 | Johnson Jr. | 73/40.5 X |
| 4,590,462 | 5/1986 | Moorehead | 73/61.1 X |

Primary Examiner—Michael S. Marcus
Assistant Examiner—Lynn M. Kummert
Attorney, Agent, or Firm—Mortenson & Uebler

[57] ABSTRACT

A detector for detecting leaks of a corrosive liquid such as strong acids or bases is provided comprising a light guide core having a covering which generates heat upon contact with the liquid to the detected, thereby changing the light transmissivity of the light guide, which change can be measured. The covering comprises a porous polymer having a salt within its pores such as an ammonium salt which dissolves in the liquid to be detected and generates heat thereby.

20 Claims, 1 Drawing Figure

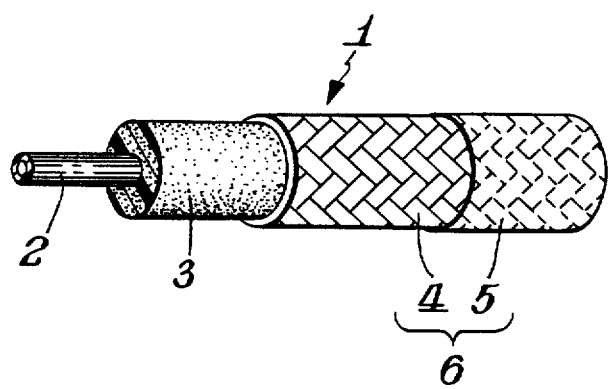

CORROSIVE LIQUID LEAK DETECTING SENSOR

BACKGROUND OF THE INVENTION

The present invention relates to a sensor for detecting the leakage of a corrosive liquid, more particularly, to a leaking liquid sensor which is capable of accurately and quickly detecting leakage of a liquid which may occur from a pipeline transporting a corrosive liquid such as a strong acid or alkaline liquid.

In a chemical plant or the like, where large quantities of strong acids such as hydrochloric acid and nitric acid or strongly alkaline liquids such as aqueous solutions of caustic soda are used, it is general practice to transport each of these liquids through a pipeline. In such a transportation system, if leakage of such a corrosive liquid is not detected, the leaking liquid may corrode equipment located near the leakage, or it may result in an accident. It is therefore essential to develop a sensor which can detect leakage of such a corrosive liquid.

Although there is no known sensor which exactly corresponds to the sensor of this type, a cable-like sensor for detecting leakage of an electrically conductive liquid has been proposed, in, for example, the specification of Japanaese Utility Model Laid-Open No. 96248/1983 under the title of "Sensor for Detecting Conductive Liquid" and of Japanese Utility Model Laid-Open No. 167436/1983 under the title of "Leaked Liquid Detecting Wire".

These conductive liquid detecting sensors, however, have a disadvantage in that water droplets and condensation can result in errors because these sensors detect a leakage by detecting conduction between electrodes or a drop in the resistance between electrodes.

In view of the disadvantages of the prior art described above, it is an object of the present invention to provide a sensor for detecting a leaked liquid which is capable of selectively detecting the leakage of a corrosive liquid such as alkaline or acid liquid both quickly and accurately, and which does not generate errors when in contact with water.

SUMMARY OF THE INVENTION

A detector for detecting leaks of a corrosive liquid is provided comprising an elongated optical fiber light guide core having a covering thereover, and light-emitting and light-receiving means connected to the light guide core, wherein the covering is one which generates heat upon contact with the liquid to be detected thereby changing the light transmissivity of the light guide, which change is detected by the light-receiving means. The optical fiber is preferably a plastic fiber such as a polymethylmethacrylate fiber, but a glass fiber also may be employed. The covering is preferably a covering of a porous polymer containing within its pores a material which generates heat upon contact with the liquid to be detected. The porous polymer may be foamed polyurethane or expanded, porous polytetrafluoroethylene, for example. When the liquid to be detected is alkaline, the material which generates heat may be an ammonium salt such as ammonium chloride or ammonium sulphate. When the liquid to be detected is acid, the material which generates heat may be sodium carbonate. The detector may have an outer covering comprising a covering of knitted polyester fibers and a water-repellent paint may cover a portion of the outer surface of the covering of knitted polyester fibers.

The paint may be a fluoride powder and adhesive agent in a solvent and containing a vulcanizing agent.

BRIEF DESCRIPTION OF THE DRAWINGS

The sole FIGURE is a perspective view, with one end broken away, of one embodiment of a sensor according to the present invention for detecting a liquid leak.

DETAILED DESCRIPTION OF THE INVENTION AND PREFERRED EMBODIMENTS WITH REFERENCE TO THE DRAWINGS

A detector for detecting leaks of a corrosive liquid such as strong acids or bases is provided comprising a light guide core having a covering which generates heat upon contact with the liquid to be detected, thereby changing the light transmissivity of the light guide, which change can be measured. The covering comprises a porous polymer having a salt within its pores such as an ammonium salt which dissolves in the liquid to be detected and generates heat thereby.

A sensor for detecting a leaked liquid is provided comprising an optical fiber and a heat-generating layer disposed outside the optical fiber, the heat-generating layer generating heat when it makes contact with the liquid which is to be detected so as to lower the optical transmissivity of the optical fiber.

If the liquid to be detected is alkaline, the heat-generating layer disposed outside the optical fiber may be formed by dispersing in a polymeric body which has continuous pores, such as a foamed urethane resin, an ammonium salt which dissolves in an alkaline liquid and generates heat thereby. The optical fiber may be formed of a plastic fiber, because it readily lowers its optical transmissivity when heated.

A liquid-pervious outer jacket may be employed, for example a knitted covering made from a synthetic resin such as polyester as well as a layer of a water-repellent paint applied to the knitted covering, may be provided over the optical fiber and the heat-generating layer. In this case, the optical fiber at the center can be protected by the porous polymeric covering and the knitted covering, thereby preventing sensor errors which may be caused by external forces. Even if the heat-generating layer is made of a material which is affected by water, a water-repellent layer can be employed to prevent water droplets and condensation from penetrating the sensor, and the properties of the heat-generating layer can thereby be prevented from deteriorating.

As stated, the sensor according to the present invention includes an optical fiber and a heat-generating layer provided around the outer periphery of the optical fiber which generates heat when it comes into contact with the liquid to be detected resulting in a lowering of the optical transmissivity of the fiber. In consequence, when a leakage of liquid occurs and the leaked liquid makes contact with the heat-generating layer, the layer generates heat so that the optical fiber is heated. This causes the optical fiber to be thermally deformed, lowering the optical transmissivity thereof. This could even break the fiber. Thus, the leakage of liquid can be detected by providing light-emitting and light-receiving elements at each end of the sensor and by measuring changes in the output of these elements.

A plastic fiber such as polymethylmethacrylate may be used as the optical fiber in this case. Because a plastic optical fiber is more sensitive to heat than one made of glass fiber it readily decreases in optical transmissivity even when a small amount of liquid penetrates, i.e., when a small amount of heat is generated, so that the sensor has excellent sensitivity.

The heat-generating layer may be formed by, for example, dispersing in a polymeric, porous body having continuous pores, such as a foamed urethane resin, a substance which reacts with the liquid to be detected and generates heat. If an ammonium salt is mixed into the porous body, only an alkaline liquid can be selectively detected, since the ammonium salt does not react with other types of liquid. Thus, the detection of various types of liquids is possible through selection of a suitable substance to react with the liquid to be detected in the heat-generating layer.

A liquid-pervious jacket may be provided covering the heat-generating layer comprising a knitted covering of a polyester fiber and a water-repellent layer formed over the outer periphery of the knitted covering, but not to such an extent that it blocks the holes in the knitted body. In this case, the optical fiber located at the center of the sensor can be protected from external forces by the porous polymeric covering which also serves as a shock absorber against external impacts, as well as by the knitted covering which efficiently maintains the shape of the sensor, thereby substantially eliminating errors in the sensor. When the heat-generating layer is made of a material which is affected by water, the water-repellent layer can prevent water drops or condensation from penetrating into the sensor. This prevents any deterioration in the properties of the heat-generating layer, ensuring long-lasting, stable performance of the sensor.

The sole figure is a perspective view, with an end portion broken away, of a sensor 1 for detecting a leaking liquid according to the present invention. The sensor 1 comprises an optical fiber 2 made of a plastic, a heat-generating layer 3 which is provided outside the optical fiber 2 and which generates heat when it comes into contact with the liquid to be detected so that it lowers the optical transmissivity of the fiber 2, and a liquid-pervious jacket 6 which is provided outside the heat-generating layer 3 and which comprises a knitted covering 4 of polyester fiber filaments and a layer of a water-repellent paint 5 formed over the outer periphery of the knitted body 4. This water-repellent paint 5 may be a fluoride powder and adhesive agent in a solvent and containing a vulcanizing agent.

The water-repellent layer 5 of the liquid-pervious jacket 5 is applied to the surface of the knitted covering 4 by spraying on a water-repellent paint, but not to such an extent that it blocks all the holes in the knitted body 4. Water drops and condensation can be substantially prevented from penetrating the sensor. This is particularly effective if the heat-generating layer 3 is made of a material which is deteriorated by water. It is, however, not necessary to provide the water-repellent layer 5 if water-vapor resistance need not be taken into consideration, depending on the installation site of the sensor 1 or the type of the liquid to be detected. Even the liquid-pervious jacket 6 need not be provided, depending on the conditions of use.

The heat-generating layer 3 is formed by dispersing an ammonium salt such as ammonium chloride or ammonium sulfate within a polymeric, porous body having continuous pores, such as a foamed urethane resin or expanded, porous polytetrafluoroethylene which has continuous pores, if the liquid to be detected is alkaline.

Such ammonium salts are suitable because they generate a large quantity of heat for a small amount of leaking liquid, and this increases the sensitivity of the sensor. The continuous pores enable penetration of the leaked liquid in the heat-generating layer 3. This in turn speeds the exothermic reaction and ensures efficient heat generation. Further, a large number of continuous pores act as a shock-absorbing layer to protect the optical fiber 2.

The heat-generating layer 3 may also be arranged in other ways, so that it is possible to detect liquids other than alkaline liquids by selecting a suitable configuration for the layer 3. For example, for detecting acids sodium carbonate may be used.

As will be understood from the foregoing description, the sensor of the present invention includes an optical fiber and a heat-generating layer provided on the outside of the optical fiber, the layer generating heat when it comes into contact with a liquid to be detected and thus decreasing the optical transmissivity of the optical fiber. In consequence, it is possible to selectively detect a corrosive liquid such as an alkaline or acid liquid quickly and accurately, providing a reliable sensor.

Detection of liquids other than the above-mentioned corrosive liquids is possible if the configuration of the heat-generating layer is selected as appropriate. This makes the sensor very practical.

This invention is not limited to the preferred embodiment described above. Modifications and alterations in, for example, the material of the heat-generating layer and the shape of the sensor may be made without departing from the scope of the appended claims.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. A device of manufacture for detecting leaks of a corrosive liquid comprising an elongated optical fiber light guide core having a covering thereover, and light-emitting means and light-receiving means connected to the light guide core, wherein said covering generates heat upon contact with a corrosive liquid to be detected thereby changing the light transmittivity of the light guide core, which change is detected by said light-receiving means, wherein said covering is a porous polymer containing within its pores a material which generates heat upon contact with the corrosive liquid to be detected and wherein the liquid to be detected is alkaline and said material which generates heat is an ammonium salt.

2. The device of claim 1 wherein said optical fiber light guide care is a glass fiber.

3. The device of claim 1 wherein said porous polymer is foamed polyurethane.

4. The device of claim 1 wherein said porous polymer is expanded, porous polytetrafluoroethylene.

5. The device of claim 1 wherein said ammonium salt is ammonium chloride

6. The device of claim 1 wherein said ammonium salt is ammonium sulphate.

7. The device of claim 1 wherein said optical fiber light guide care is a plastic fiber.

8. The device of claim 7 wherein said optical fiber light guide care is a polymethylmethacrylate fiber.

9. The device of claim 1 having an outer covering comprising knitted polyester fibers.

10. The device of claim 9 wherein a water-repellent paint covers a portion of said covering of knitted polyester fibers.

11. The device of claim 10 wherein said paint is a fluoride powder and adhesive agent in a solvent and containing a vulcanizing agent.

12. A device of manufacture for detecting leaks of a corrosive liquid comprising an elongated optical fiber light guide core having a covering thereover, and light-emitting means and light-receiving means connected to the light guide core, wherein said covering generates heat upon contact with a corrosive liquid to be detected thereby changing the light transmittivity of the light guide core, which change is detected by said light-receiving means, wherein said covering is a porous polymer containing within its pores a material which generates heat upon contact with the corrosive liquid to be detected and wherein the liquid to be detected is acid and said material which generates heat is sodium carbonate.

13. The device of claim 12 wherein said optical fiber light guide core is a glass fiber.

14. The device of claim 12 wherein said porous polymer is foamed polyurethane.

15. The device of claim 12 wherein said porous polymer is expanded, porous polytetrafluoroethylene.

16. The device of claim 12 wherein said optical fiber light guide core is a plastic fiber.

17. The device of claim 16 wherein said optical fiber light guide core is a polymethylmethacrylate fiber.

18. The device of claim 12 having an outer covering comprising knitted polyester fibers.

19. The deivce of claim 18 wherein a waterrepellent paint covers a portion of said covering of knitted polyester fibers.

20. The device of claim 19 wherein said paint is a fluoride powder and adhesive agent in a solvent and containing a vulcanizing agent.

* * * * *

UNITED STATES PATENT AND TRADEMARK OFFICE
CERTIFICATE OF CORRECTION

PATENT NO. : 4,710,353

DATED : December 1, 1987

INVENTOR(S) : Satoshi Tanaka and Haruo Imaizumi

It is certified that error appears in the above-identified patent and that said Letters Patent is hereby corrected as shown below:

In column 3, line 50, the number "5" should be —6—.

Signed and Sealed this

Seventh Day of June, 1988

Attest:

DONALD J. QUIGG

Attesting Officer

Commissioner of Patents and Trademarks